(12) United States Patent
Venderbosch

(10) Patent No.: US 6,350,514 B1
(45) Date of Patent: Feb. 26, 2002

(54) THERMOPLASTIC BLENDS WITH IMPROVED ADHESION AND THERMAL STABILITY

(75) Inventor: Robert Walter Venderbosch, Bergen op Zoom (NL)

(73) Assignee: General Electric Co., Pittsfield, MA (US)

( * ) Notice: Subject to any disclaimer, the term of this patent is extended or adjusted under 35 U.S.C. 154(b) by 0 days.

(21) Appl. No.: 09/496,827

(22) Filed: Feb. 2, 2000

(51) Int. Cl.[7] .......................... B32B 27/40; C08F 283/08
(52) U.S. Cl. .................... 428/319.7; 523/468; 524/251; 524/255; 525/392; 525/905
(58) Field of Search ................................ 525/392, 905; 524/251, 255; 523/468; 428/319.7

(56) References Cited

U.S. PATENT DOCUMENTS

| | | |
|---|---|---|
| 4,123,474 A | 10/1978 | Katchman |
| 4,161,492 A | 7/1979 | Weissel |
| 4,189,411 A | 2/1980 | Haaf |
| 4,289,906 A | 9/1981 | Shin ........................... 564/330 |
| 4,914,153 A * | 4/1990 | Togo et al. ............. 525/905 X |
| 4,978,791 A | 12/1990 | Volker et al. ................ 564/335 |
| 5,159,004 A | 10/1992 | Furuta et al. ................ 524/390 |
| 5,182,336 A * | 1/1993 | Abe et al. ............... 525/905 X |
| 5,204,410 A * | 4/1993 | Banevicius et al. ..... 525/905 X |
| 5,278,254 A * | 1/1994 | Furuta et al. ........... 525/392 X |
| 5,431,765 A * | 7/1995 | Decker et al. .......... 525/393 X |
| 5,489,640 A | 2/1996 | Riding ........................ 524/423 |
| 5,504,130 A | 4/1996 | Riding ........................ 524/270 |
| 5,554,693 A | 9/1996 | Ohtomo et al. ............. 525/133 |
| 5,756,196 A | 5/1998 | Chao et al. ............... 428/319.3 |
| 5,910,526 A | 6/1999 | Chu et al. ................... 524/270 |

FOREIGN PATENT DOCUMENTS

| | | | | |
|---|---|---|---|---|
| EP | 0 751 185 A2 | | 2/1997 | |
| EP | 0 808 871 A1 | | 11/1997 | |
| JP | 0 176 243 | * | 10/1983 | ................. 524/255 |
| JP | 05 032881 | | 9/1991 | |
| SU | 487096 | * | 10/1975 | ................. 523/468 |

* cited by examiner

Primary Examiner—Richard D. Lovering

(57) ABSTRACT

Improved thermal stability and good adhesion to polyurethane foam are provided by polyphenylene ether thermoplastic blends containing a polystyrene and an aromatic amine. Preferred compositions additionally containing tackifier resins are described. These compositions are particularly useful for molding automobile interior parts.

19 Claims, No Drawings

THERMOPLASTIC BLENDS WITH IMPROVED ADHESION AND THERMAL STABILITY

BACKGROUND OF THE INVENTION

This invention relates to compositions of thermoplastic blends. More particularly, the invention relates to thermoplastic blends comprising a poly(arylene ether) and a poly(alkenylaromatic) compound.

Thermoplastic resins have been used in recent years as a replacement for metal in the interior parts of automobiles, such as the instrument panels, top covers and arm rests. Recently there has been a desire for materials with exceptional stability of mechanical properties during the lifetime of the vehicle. This desire is motivated by safety precaution, in general, and particularly by requirements for seamless instrument panels for use with air bags. Further requirements of the thermoplastic resin are that it must have low odor and emission and must adhere to polyurethane foam, to which the thermoplastic is bonded to form an automobile interior part.

U.S. Pat. No. 5,910,526 to Chu et al. teaches the addition of terpene phenol resins to a thermoplastic to promote moldability and adhesion to polyurethane foam. However, the use of such terpene phenol resins has the undesired effect of reducing the thermal stability of the finished thermoplastic article. U.S. Pat. No. 5,756,196 to Chao et al. describes thermoplastic compositions comprising polyphenylene ethers, poly(alkenylaromatic) compounds, and primary or secondary aliphatic amine compounds. Compared to formulations without the aliphatic amine compound, these compositions exhibit improved surface adhesion to polyurethane foam. However, there is a desire for adhesion-promoting materials with higher inherent stability, lower corrosivity, and lower volatility to facilitate use at high compounding temperatures. There is also a desire for adhesion-promoting materials that can be handled as solids.

There is therefore a need for thermoplastic resins that exhibit improved thermal stability and processing characteristics while maintaining good adhesion to polyurethane foam.

BRIEF SUMMARY OF THE INVENTION

Good adhesion to polyurethane foam and improved thermal stability is provided by a thermoplastic composition comprising: (a) a poly(arylene ether) at about 20 to about 80 weight percent; (b) a poly(alkenylaromatic) material at about 20 to about 80 weight percent; and (c) an aromatic amine at about 0.1 to about 25 weight percent, based on the weight of the entire composition.

DETAILED DESCRIPTION OF THE INVENTION

Good thermal stability and adhesion to polyurethane foam are provided by a thermoplastic composition comprising: (a) a poly(arylene ether) at about 20 to about 80 weight percent; (b) a poly(alkenylaromatic) material at about 20 to about 80 weight percent; and (c) an aromatic amine at about 0.1 to about 25 weight percent, based on the weight of the entire composition.

Although all conventional poly(arylene ether)s can be employed with the present invention, polyphenylene ethers ("PPE") are preferred. Poly(arylene ether)s per se, are known polymers comprising a plurality of structural units of the formula:

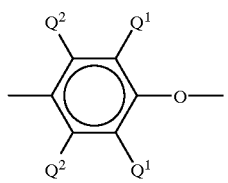

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Preferably, each $Q^1$ is alkyl or phenyl, especially $C_{1-4}$ alkyl, and each $Q^2$ is hydrogen.

Both homopolymer and copolymer poly(arylene ether)s are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether)s containing moieties prepared by grafting vinyl monomers or polymers such as polystyrenes, as well as coupled poly(arylene ether)s in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s of the present invention further include combinations of any of the above.

The poly(arylene ether)s generally have a number average molecular weight of about 3,000 to about 40,000 and a weight average molecular weight of about 20,000 to about 80,000, as determined by gel permeation chromatography. The poly(arylene ether) generally has an intrinsic viscosity of about 0.10 to about 0.60 deciliters per gram (dL/g), preferably about 0.29 to about 0.48 dL/g, all as measured in chloroform at 25° C. It is also possible to utilize a high intrinsic viscosity poly(arylene ether) and a low intrinsic viscosity poly(arylene ether) in combination. Determining an exact ratio, when two intrinsic viscosities are used, will depend somewhat on the exact intrinsic viscosities of the poly(arylene ether) used and the ultimate physical properties that are desired.

The poly(arylene ether) is typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful poly(arylene ether)s for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90 weight percent of the polymer, may contain at least one of said aminoalkyl-containing and 4-hydroxybiphenyl end groups.

It will be apparent to those skilled in the art from the foregoing that the poly(arylene ether) contemplated for use in the present invention include all those presently known, irrespective of variations in structural units or ancillary chemical features.

The poly(alkenylaromatic) compound employed in the thermoplastic resinous substrate composition includes homopolymers and copolymers of such compounds as styrene, α-methylstyrene, 4-methylstyrene, dibromostyrene, and the like, and combinations comprising at least one of these compounds with, styrene generally preferred. Particularly preferred are conventional rubber-modified polystyrenes, sometimes designated "high impact polystyrene" or "HIPS". Also highly preferred are non-impact modified polystyrenes (often referred to as crystal clear polystyrene or ccPS), such as the material sold by Elf Atochem as Lacqrene 1810, or the material sold by Nova Chemicals as Crystal 209.

It is known that poly(arylene ether)s and poly(alkenylaromatic) materials are miscible in all proportions. While poly(arylene ether) and poly(alkenylaromatic) material blends containing any proportion of the two resins may be employed in the invention, it is preferred that the poly(arylene ether) be present in amounts of about 20 to about 80 weight percent of the total composition, preferably about 20 to about 60 weight percent of the total composition, and more preferably about 25 to about 50 weight percent of the total composition. The poly(alkenylaromatic) material can be present in an amount of about 20 to about 80 weight percent of the total composition, preferably about 20 to about 60 weight percent of the total composition, and more preferably about 25 to about 55 weight percent of the total composition.

A further component of the thermoplastic composition is an aromatic amine. Preferred aromatic amines employed in the thermoplastic compositions are represented by the formula:

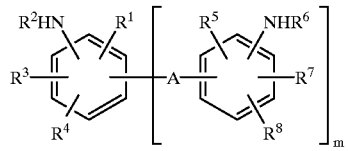

wherein $R^1$, $R^3$, $R^4$, $R^5$, $R^7$ and $R^8$ are independently hydrogen, linear or branched monovalent alkyl having 1 to about 6 carbon atoms, or halogen; $R^2$ and $R^6$ are independently hydrogen or monovalent alkyl having 1 to about 6 carbon atoms; m is 0, 1 or 2; and A is a direct aromatic ring fusion, a direct single bond or a divalent radical selected from the group comprising

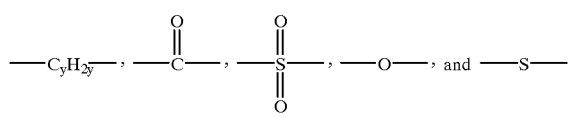

wherein y is an integer from 1 to 5.

Suitable aromatic amines include, for example: m-phenylenediamine; p-phenylenediamine; 4,4'-diaminodiphenylpropane; 4,4'-diaminodiphenylmethane (commonly named 4,4'-methylenedianiline); bis(2-chloro-4-amino-3,5-diethylphenyl) methane; 4,4'-diaminodiphenyl sulfide; 4,4'-diaminodiphenyl sulfone; 4,4'-diaminodiphenyl ether (commonly named 4,4'-oxydianiline); 1,5-diaminonaphthalene; bis(4-aminophenyl)methane; benzidine; 3,3'-dimethylbenzidine; 3,3'-dimethoxybenzidine; 2,4-bis(beta-amino-t-butyl)toluene; bis(p-beta-amino-t-butylphenyl)ether; bis(p-beta-methyl-o-aminophenyl)benzene; bis(p-beta-methyl-o-aminopentyl)benzene; 1,3-diamino-4-isopropylbenzene; m-xylylenediamine; p-xylylenediamine; 2-methyl-4,6-diethyl-1,3-phenylenediamine; 5-methyl-4,6-diethyl-1,3-phenylenediamine; 2,4-diaminotoluene; 2,6-diaminotoluene; isomers of diethyltoluenediamine; 4,4'-methylene-bis-(2-ethyl-6-methylaniline); 4,4'-methylene-bis-(2,6-diethylaniline); 4,4'-methylene-bis-(2-isopropyl-6-methylaniline); 4,4'-methylene-bis-(2,6-diisopropylaniline); 4,4'-methylene-bis-(3-chloro-2,6-diethylaniline); and mixtures comprising at least one of these compounds, and the like.

Examples of highly preferred aromatic amines include

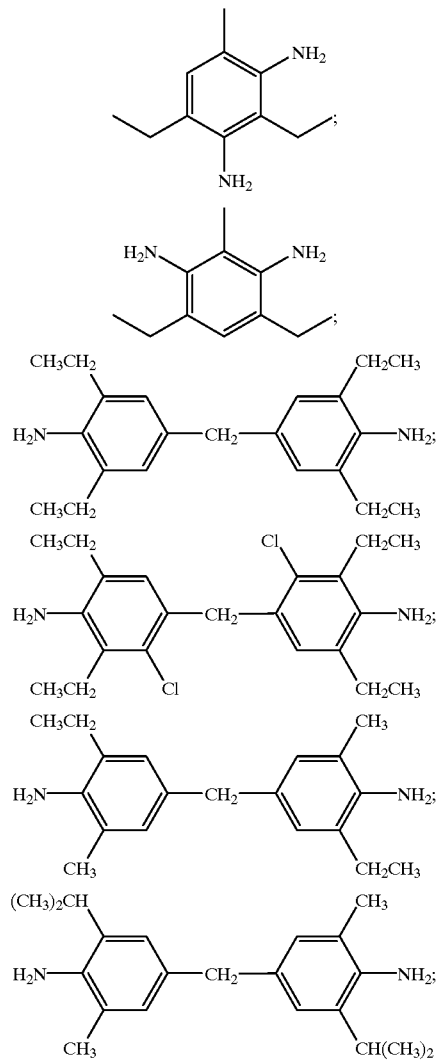

-continued

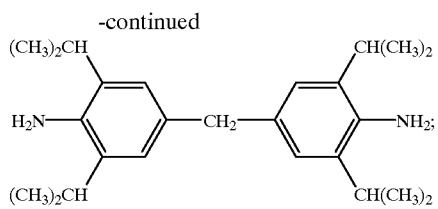

and mixtures comprising at least one of these compounds, and the like.

Many of the useful aromatic amines are commercially available. For example, isomeric mixtures of diethyl toluene diamine are available from Lonza as DETDA 80, and from Albemarle Corporation under the trademark ETHACURE® as ETHACURE® 100. 4,4'-Methylene-bis-(3-chloro-2,6-diethylaniline) and 4,4'-methylene-bis-(2,6-diethylaniline) are available from Lonza. Aromatic amines may also be prepared according to published syntheses as, for example, in U.S. Pat. No. 4,289,906 to Shin, U.S. Pat. No. 4,161,492 to Weissel, and U.S. Pat. No. 4,978,791 to Volker et al., the disclosures of which are incorporated by reference.

The aromatic amine compounds may be employed at concentrations of about 0.1 to about 25 weight percent of the total composition. Preferred compositions comprise aromatic amine compounds at about 0.1 to about 12 weight percent, with compositions comprising about 0.1 to about 6 weight percent being highly preferred.

The thermoplastic composition, in addition to the aforementioned components, may also contain rubber polymers as optional components. Rubber polymers include natural rubber polymers, which are elastic at room temperature, as well as synthetic polymers. Specific examples include natural rubber, butadiene polymer, styrene-isoprene copolymer, butadiene-styrene copolymer (including random copolymers, block copolymers, graft copolymers, etc.), isoprene polymer, chlorobutadiene polymer, butadiene-acrylonitrile copolymer, isobutylene polymer, isobutylene-butadiene copolymer, isobutylene-isoprene copolymer, acrylic acid ester polymer, ethylene-propylene copolymer, ethylene-propylene-diene copolymer, thiokol rubber, polysulfide rubber, polyurethane rubber, polyether rubber (such as polypropylene oxide, etc.), epichlorohydrin rubber, and the like, as well as combinations comprising at least one of these rubbers.

These rubber polymers may be produced using any polymerization method (such as emulsion polymerization, solution polymerization, or the like) and using any catalyst (such as peroxide, trialkylaluminum, halogenated lithium, or nickel catalysts, or others). Moreover, one may also use substances having various degrees of crosslinking, substances having varying microstructures (such as a cis structure, a trans structure, or a vinyl group), or substances having rubber particles of varying average diameter. Moreover, any type of copolymer, such as random copolymers, block copolymers, or graft copolymers may be used. Furthermore, in producing these rubber polymers, copolymers with monomers such as other olefins, dienes, aromatic vinyl compounds, acrylic acid, acrylic acid esters, methacrylic acid esters, etc., are also possible. These copolymers may be produced by any copolymerization method, such as random copolymerization, block copolymerization, or graft copolymerization. Specific examples of these monomers include ethylene, propylene, styrene, chlorostyrene, α-methylstyrene, butadiene, isobutylene, chlorobutadiene, butene, methyl acrylate, acrylic acid, ethyl acrylate, butyl acrylate, methyl methacrylate, and acrylonitrile. Among these substances, styrene-butadiene block copolymer (SBS), styrene-isoprene block copolymer (SIS), and styrene-butadiene block copolymer or styrene-isoprene block copolymer in which a part or all of the butadiene and isoprene portions have been hydrogenated are preferred. From the standpoint of thermal stability, hydrogenated SBS (SEBS) and hydrogenated SIS (SEPS) in which all of the double bonds have been hydrogenated are particularly preferred.

Moreover, one may also use substances in which these rubber polymers have been modified using epoxy compounds, unsaturated carboxylic acid, derivatives thereof, etc.

When present, these rubber polymers may be contained in the amount of about 0.1 to about 15 weight percent of the total composition, and preferably about 1 to about 10 weight percent, with the amount of about 1 to about 7.5 weight percent being particularly preferred.

In addition to the aforementioned components, the thermoplastic composition may also optionally comprise one or more tackifier resins. When present, these materials may be employed at a total of about 0.1 to about 20 weight percent of the total composition. A preferred concentration is about 1 to about 15 weight percent of the total composition, with the amount of about 1 to about 12 weight percent being particularly preferred. Typical tackifier resins which may be used include polyolefins; polymerized mixed olefins; petroleum $C_5$–$C_9$ resins and their derivatives; coumarone indene resins and their derivatives; wood, gum or tall oil rosins and their derivatives; terpene resins and their derivatives; aromatic hydrocarbon resins; and aliphatic hydrocarbon resins.

Preferred tackifiers comprise wood, gum or tall oil rosin and their derivates, such as dimerized rosin, polymerized rosin, disproportionated rosin, hydrogenated rosin, maleic acid modified rosin, fumaric acid modified rosin and all the esters thereof, including esters with diethylene glycol, triethylene glycol, glycerol or pentaerythritol. Also preferred are terpene derivatives such as polyterpene, hydrogenated or partially hydrogenated polyterpene resins, styrenated terpene resin and hydrogenated or partially hydrogenated petroleum $C_5$–$C_9$ hydrocarbon resins.

Highly preferred tackifiers belong to the esterified rosins and esterified rosin derivates, including: the pentaerythritol ester of tall oil rosin available from the Arizona Chemical Company (Panama City, Fla.) under the trademark SYLVATAC® and sold as SYLVATAC® RE80, RE85, RE90, RE100F, RE100S, and RE110; the rosin esters available from the Arizona Chemical Company under the trademark SYLVALITE® and sold as SYLVALITE® RE88F, RE88S, RE100F, RE100S, RE105F, RE105S, RE115; the glycerol and pentaerythritol esters of rosin available from DRT (Dax, France) under the trade name Dertoline as Dertoline CG, G2, G5 and G2L, and Dertoline P2 and P2L, respectively; the stabilized glycerol and pentaerythritol esters of rosin available from DRT under the trade name Dertoline as Dertoline SG2 and SP2, respectively; the glycerol and pentaerythritol ester of polymerized rosin available from DRT under the trade name Dertopoline as Dertopoline CG and G, and Dertopoline P125, respectively; the glycerol and pentaerythritol ester of hydrogenated rosin available from DRT under the trade name Hydrogral as Hydrogral G and G5, and Hydrogral P, respectively; the pentaerythritol ester of dimerized rosin available from DRT under the trade name Dertopoline as Dertopoline MDP; the hydrogenated hydrocarbon resin available from Arakawa Chemical Inc. under the trademark ARKON® and sold, depending on softening point, as ARKON® P140, P125, P115, P100, P90, and P70;

the hydrogenated hydrocarbon resin available from Hercules International Ltd. under the trademark REGALITE® and sold, depending on the softening point, as REGALITE® R-1100 and R-1125; and the hydrogenated polyterpene resin available from Yasuhara Chemical Co., Ltd. (Hiroshima, Japan) under the trademark CLEARON® and sold, depending on softening point, as CLEARON® P125, P115, P105, and P85.

While the tackifier resin may comprise a phenol terpene resin, the thermal stability of the thermoplastic resin is improved if the concentration of phenol terpene resin is limited to less than about 10 weight percent, preferably less than about 6 weight percent, most preferably zero weight percent, based on the weight of the entire composition.

The thermoplastic composition may further optionally comprise one or more reinforcing filler materials. Suitable reinforcing fillers are those that increase the rigidity of the blend. Among these, fibrous materials are preferred, in particular glass fibers made from low alkali E-glass, having a fiber diameter of about 8 to about 20 micrometers, with the preferred length of the glass fibers in the finished injection molding being about 0.01 to about 0.5 millimeters. The glass fibers may be employed as rovings or as chopped or milled glass fibers, and may be provided with a suitable finish and an adhesion promoter or promoter system based on silanes and the like. The amount of the reinforcing filler is generally an amount sufficient to increase the rigidity of the composition. The amount of reinforcing fillers, based on the total weight of the composition, is advantageously about 5 to about 60 weight percent, especially from about 5 to about 30 weight percent, based on the weight of the entire composition.

However, other fibrous reinforcing materials, e.g., carbon fibers and microfibers, potassium titanate single-crystal fibers, gypsum fibers, aluminum oxide fibers, asbestos, or the like, or a combination thereof may also be incorporated. Also, non-fibrous fillers, such as, glass beads, hollow glass beads, glass flake, talc, clay and mica may be used alone or in combination with one or more fibrous fillers. Like the glass fibers, these latter fillers may be provided with a finish and/or an adhesion promoter or adhesion promoter system.

The thermoplastic resin may further optionally comprise activated carbon. Activated carbon is an amorphous form of carbon which is treated to have a very large surface area. This large surface area means there is a high internal porosity which provides high adsorptiveness. Suitable activated carbon materials are sold by Sutcliffe Speakman Carbons Limited under the trade name Odourcarb, and a preferred activated carbon is sold as Odourcarb 203 CP or Odourcarb 203 CP FG (fine grind). Activated carbon may be present at from 0 to about 4 weight percent, preferably about 1 to about 3 weight percent, and more preferably about 1 to about 2 weight percent, based on the weight of the entire composition.

Compositions of the present invention can also include effective amounts of at least one additive selected from antioxidants, flame retardants, drip retardants, dyes, pigments, colorants, stabilizers, antistatic agents, plasticizers, lubricants and other additives. These additives are known in the art, as are their effective levels and methods of incorporation. Effective amounts of the additives vary widely, but they can be present in an amount up to or exceeding about 50 weight percent, based on the weight of the entire composition. Especially preferred additives include hindered phenols, phosphites, thio compounds and amides derived from various fatty acids. The preferred amounts of these additives generally range up to about 2.5 weight percent total combined weight, based on the total weight of the composition.

A preferred thermoplastic composition comprises a poly (arylene ether) at about 20 to about 80 weight percent, a poly(alkenylaromatic) compound at about 20 to about 80 weight percent, an aromatic amine at about 0.1 to about 25 weight percent, and one or more tackifiers selected from the classes of tackifiers described above at about 0.1 to about 20 weight percent, based on the total weight of the composition.

A highly preferred thermoplastic composition comprises a poly(arylene ether) at about 20 to about 80 weight percent, a poly(alkenylaromatic) compound at about 20 to about 80 weight percent, an aromatic amine at about 0.1 to about 25 weight percent, a rosin ester at about 0.1 to about 20 weight percent, and a hydrogenated hydrocarbon or polyterpene resin or at about 0.1 to about 20 weight percent.

The preparation of the composition is normally achieved by merely admixing the ingredients under conditions for the formation of an intimate blend. Such conditions often include mixing in single or twin screw type extruders or similar mixing devices which can apply a shear to the components. Reinforcing filler materials, when present, are sometimes added near the end of the admixing step to reduce changes to their physical state. It is often advantageous to apply a vacuum to the melt through at least one or more vent ports in the extruder to remove volatile impurities in the composition. It is also advantageous to use steam stripping to increase removals of volatile impurities in the composition.

It should be clear that improved molded articles prepared from the composition of the present invention, especially those further comprising polyurethane foam, represent an additional embodiment of the invention.

It should also be clear that the invention encompasses reaction products of these compositions.

The following examples are provided to illustrate some embodiments of the invention. They are not intended to limit the invention in any aspect. All percentages are by weight based on the total weight of the composition, unless otherwise indicated. All parts are parts by weight.

EXAMPLE 1

A series of thermoplastic formulations was prepared with a base composition of 40 weight percent polyphenylene ether resin (obtained as PPO® 803 from GE Plastics, Pittsfield, Mass.), 40 weight percent of polystyrene (obtained from Elf Atochem under the trade name Lacqrene 1810; number average molecular weight Mn=90,000; weight average molecular weight Mw=215,000; Mw/Mn= 2.4), 10 weight percent glass fiber (14 micrometer diameter, obtained from Owens Corning S.A. as CS 122Y 14P), 6.5 weight percent SEBS rubber (copoly(styrene-b-ethylene/ butylene-b-styrene), weight percent styrene), obtained from Shell, The Netherlands, under the trademark KRATON® as KRATON® G1651E), 1.5 weight percent low density polyethylene obtained from DSM (Heerlen, The Netherlands) under the trade name STAMYLAN® as STAMYLAN® LD 1922T, 1.5 weight percent of the hindered phenol preservative, pentaerythritol-tetrakis(3-(3,5-di-tert-butyl-4-hydroxyphenyl)propionate (supplied by Ciba under the trademark IRGANOX® as IRGANOX® 1010), 0.3 weight percent of a liquid phosphite mix preservative (supplied by General Electric Specialty Chemicals under the trademark WESTON® as WESTON® GEP1), 0.1 weight percent zinc sulfide (greater than 96% pure, supplied by Sachtleben Chemie J.G., Duisburg, Germany, under the trademark SACHTOLITH® as SACHTOLITH® HD), 0.1 weight percent zinc oxide (greater than 99.7% pure, supplied by Union Miniere, Brussels, Belgium, under the trade name ZnO Neige), and 1.5 weight percent carbon black as a colorant (supplied by Cabot BV, Botlek, The Netherlands, under the trademark ELFTEX® as ELFTEX® 570).

Variable additives included a terpene phenol resin obtained from Arizona Chemical S.A. under the trademark SYLVARES® as SYLVARES® TP7042E; a poly(oxypropylene-diamine) obtained from Huntsman Petrochemical Corporation under the trademark JEFFAMINE® as JEFFAMINE® D2000; 4,4'-Methylene-bis-(3-chloro-2,6-diethylaniline), abbreviated MCDEA, obtained from algroup Lonza; and 4,4'-Methylene-bis-(2,6-diethylaniline), abbreviated MDEA, obtained from algroup Lonza.

Compositions were prepared using water injection (steam stripping) for removal of volatiles.

Samples included either no additive, or the various additives listed in Table 1. The additives replaced an equal amount of the polystyrene Lacqrene 1810 in the formulation.

Samples were compounded on a Werner & Pleiderer co-rotating twin screw extruder (28 millimeter screw). The compositions were molded according to IS0294 on a Stork injection molding machine (type 510-130, clamping force 1300 kiloNewtons).

Property retention was determined by testing samples as molded and after aging for 500 hours at 120° C. This accelerated high-temperature aging test simulates ambient aging over the life of the product. Flexural strength tests were conducted according to ISO 178. Unnotched Izod impact tests were conducted according to ISO 180.

Foam adhesion testing was performed on injection molded discs prepared as follows. First, the two foam components, the polyol and diisocyanate, were mixed thoroughly in the prescribed ratio. This mixture was poured onto the molded disc and allowed to cure at room temperature for 24 hours, after which the foam was removed from the disc by hand. Two criteria were used to describe foam adhesion. First, the failure mode was classified by the amount of remaining coverage at the plastic surface. A complete coverage was rated "Good", a coverage between 50 and 100% was rated "Moderate", while less than 50% coverage was rated "Poor". Second, on the foam layer remaining attached to the plastic surface, the degree of adhesion was judged by a Cross Hatch Test according to ISO 2409 extended with a tape pull-off test as follows. A right angle lattice pattern was cut into the remaining foam layer. Subsequently a self adhesive tape was pressed against the surface and firmly removed. The degree of separation of the remaining foam layer is judged by the criteria described in the ISO 2409 procedure, ranging from Gt0 to Gt5. A rating of Gt0 to Gt2 is desirable.

Emission tests were conducted using headspace gas chromatography according to the procedure described in VDA Recommendation 277 published by the Organization of the German Automobile Industry (VDA). A total of two grams of sample material, in pieces ranging from about 10 to about 25 milligrams, was cut from a molded disc, and heated for 5 hours at 120° C. in a 20 milliliter headspace vial. The released vapor was analyzed by gas chromatography with flame ionization detection (FID). All peak areas were integrated and from the total peak area the emission was calculated and expressed in units of microgram carbon per gram material ($\mu$gC/g). Calibration was performed with an external standard of acetone in n-butanol. A value less than 50 $\mu$gC/g is desired.

Odor tests were conducted according to the procedure described in VDA Recommendation 270 published by the Organization of the German Automobile Industry (VDA). A 50 cm$^3$ sample of molded material was heated for 2 hours at 80° C. in a 1 liter closed glass flask. Samples were acclimatized for 5 minutes before odor evaluation. Samples were prepared in duplo and tested by two different teams of 3 persons. Odor ratings were assigned according to the following scale:

1=no perception of odor
2=just perceptible odor, not annoying
3=perceptible odor, not annoying
4=annoying odor
5=very annoying odor
6=unbearable odor.

Odor ratings less than 4 are desirable, with ratings less than 3 preferred. Test results are presented in Table 1.

TABLE 1

| Sample No. | Additive, weight percent | Foam Adhesion | Retention of Izod Unnotched Impact (%) | Retention Flexural Strength (%) | Odor | Emission ($\mu$gC/g) |
|---|---|---|---|---|---|---|
| 1* | (none) | Moderate, Gt5 | 96.9 | 99.3 | — | 124 |
| 2* | SYLVARES ® TP7042E, 12% | Good, Gt1 | 57.9 | 57.2 | 4 | 106 |
| 3* | JEFFAMINE ® D2000, 6% | Good, Gt0 | 93.5 | 95.8 | 5 | 172 |
| 4* | JEFFAMINE ® D2000, 2% | Good, Gt2 | 83.5 | 99.3 | 4.5 | 147 |
| 5 | MCDEA, 12% | Good, Gt0 | 82.6 | 93.0 | — | — |
| 6 | MCDEA, 6% | Good, Gt0 | 91.7 | 99.9 | — | — |
| 7 | MDEA, 6% | Good, Gt0 | 81.6 | 103.6 | 4 | 132 |
| 8 | MDEA, 2% | Good, Gt5 | 85.3 | 101.4 | 4 | 120 |

*comparison

The results in Table 1 illustrate several points. First, samples 1 and 2, both comparisons, illustrate the improvement in adhesion but loss of thermal stability associated with incorporation of a terpene phenol resin. The contrast between sample 2 and samples 3 and 4, all comparisons, illustrate the retention of good adhesion properties and improvement in thermal stability when Jeffamine D2000, an aliphatic amine representative of amine compounds taught in U.S. Pat. No. 5,756,196, is substituted at 2% or more for the terpene phenol resin. The contrast between samples 3 and 4, both comparisons, and samples 5–8, illustrative of the invention, shows that incorporation of aromatic amines at 6% or greater enables good adhesion and thermal stability that is comparable to, and in some cases superior to, that of the samples incorporating the aliphatic amine. Aromatic amines have the further manufacturing advantages, relative to the aliphatic amines, that they are easily handled solids with lower volatility, lower odor, and higher decomposition temperatures. For this reason the aromatic amines outperform the aliphatic amines. An additional advantage of aromatic amines is their generally lower corrosivity compared to aliphatic amines.

EXAMPLE 2

A series of thermoplastic formulations, evaluating the incorporation of four additives, was prepared with a base composition of polyphenylene ether resin (obtained as PPO® 803 from GE Plastics), polystyrene (obtained from Elf Atochem under the trade name Lacqrene 1810, Mn=90,000, Mw=215,000, Mw/Mn=2.4), 10 weight percent glass fiber (14 micrometer diameter, obtained from Owens Corning S.A. as CS 122Y 14P), 5.5 weight percent SEBS rubber (copoly(styrene-b-ethylene/butylene-b-styrene, 30 weight percent styrene, obtained from Shell, The Netherlands, under the trademark KRATON® as KRATON® G1651E), 1.5 weight percent low density polyethylene (obtained from DSM under the trade name STAMYLAN® as STAMYLAN® LD 1922T), 1 weight percent of the hindered phenol preservative, pentaerythritol-tetrakis(3-(3,5-di-tert.buthyl-4-hydroxyphenyl)propionate (supplied by Ciba under the trademark IRGANOX® as IRGANOX® 1010), 0.3 weight percent of the phosphite preservative, tris(2,4-di-tert-butylphenylphosphite) (supplied by Ciba under the trademark IRGAFOS® as IRGAFOS® 168), 0.1 weight percent zinc sulfide (greater than 96% pure, supplied by Sachtleben Chemie J.G. under the trademark SACHTOLITH® as SACHTOLITH® HD), 0.1 weight percent zinc oxide (greater than 99.7%, supplied by Union Miniere under the trade name ZnO Neige), and 0.5 weight percent carbon black as a colorant (supplied by Cabot BV under the trademark ELFTEX® as ELFTEX® 570).

The additives were an aromatic amine (MDEA, described above in Example 1) varied between 0.5 and 1.5 weight percent; a pentaerythritol ester of tall oil rosin (obtained as SYLVATAC® RE90 from Arizona Chemical Co.) varied between 0 and 6 weight percent; a hydrogenated hydrocarbon resin (obtained as ARKON® P125 from Arakawa Chemical Inc.) varied from 3 to 9 weight percent; and steam activated carbon supplied by Sutcliffe Speakman Carbons Limited under the trade name Odourcarb as Odourcarb 203 CP varied from 1 to 2 weight percent. The variation in total additive loading was compensated by the amount of (polyphenylene ether and polystyrene), in which the relative percentage of polyphenylene ether was maintained at 54 weight percent (i.e., the weight ratio of polyphenylene ether to polystyrene was held constant at 54:46). Sample formulations are given in Table 2 and were determined according to 4-factor, two-level, half-fraction factorial design with a replicated center point, for a total of 10 samples.

Property retention was determined by testing samples as molded and after aging for 500 hours at 120° C. Odor and Emission, Foam adhesion testing, Flexural strength and Izod Unnotched Impact tests were conducted using the procedures described in Example 1. Izod Notched Impact tests were conducted according to ISO 180 (the notch was cut before sample aging). Design and analysis of similar experiments is described in G. E. P. Box, W. G. Hunter and J. S. Hunter, "Statistics for Experimenters," John Wiley & Sons, pp. 306–342 (1978). Amounts of variable components and test data are presented in Table 2.

TABLE 2

| | Sample # | | | | | | | | | |
|---|---|---|---|---|---|---|---|---|---|---|
| | 20 | 21 | 22 | 23 | 24 | 25 | 26 | 27 | 28 | 29 |
| Base Composition | | | | | | | | | | |
| PPO 803 | 40.5 | 37.8 | 37.8 | 37.8 | 37.8 | 34.0 | 41.6 | 35.1 | 37.8 | 37.8 |
| Crystal PS | 34.5 | 32.2 | 32.2 | 32.2 | 32.2 | 29.0 | 35.4 | 29.9 | 32.2 | 32.2 |
| Additives | | | | | | | | | | |
| Sylvatac RE90 | 0 | 3 | 6 | 3 | 0 | 6 | 0 | 6 | 0 | 6 |
| Arkon P125 | 3 | 6 | 3 | 6 | 9 | 9 | 3 | 9 | 9 | 3 |
| MDEA | 1.5 | 1 | 1.5 | 1 | 0.5 | 1.5 | 0.5 | 0.5 | 1.5 | 0.5 |
| Activated Carbon | 2 | 1.5 | 1 | 1.5 | 2 | 2 | 1 | 1 | 1 | 2 |
| Foam Adhesion rating | | | | | | | | | | |
| Cross Hatch | Gt1 | Gt1 | Gt1 | Gt2 | Gt4 | Gt1 | Gt5 | Gt1 | Gt2 | Gt1 |
| | Gt2 | Gt1 | Gt0 | Gt1 | Gt3 | Gt0 | Gt5 | Gt2 | Gt3 | Gt1 |
| Property retention after 500 hrs aging at 120 degr. C. | | | | | | | | | | |
| Flexural Strength [%] | 101 | 99 | 100 | 98 | 98 | 98 | 97 | 100 | 94 | 97 |
| Izod Notched Impact [%] | 89 | 96 | 94 | 92 | 96 | 95 | 90 | 100 | 104 | 93 |
| Izod Unnotched Impact [%] | 92 | 106 | 96 | 92 | 93 | 109 | 104 | 92 | 97 | 91 |
| Emission and Odor rating | | | | | | | | | | |
| Odor [–] | 3.8 | 3.5 | 3.6 | 2.2 | 3.3 | 3.5 | 3.4 | 3.2 | 3.1 | 3.8 |
| Emission [ugC/gr] | 17 | 31 | 30 | 18 | 18 | 27 | 22 | 27 | 32 | 16 |

The data in Table 2 and the statistical analyses thereof (not shown) reveal that foam adhesion is promoted by higher levels of MDEA (aromatic amine), SYLVATAC® RE90 and activated carbon, with MDEA and SYLVATAC® being the most important. Furthermore, all samples exhibit outstanding heat aging performance (greater than or equal to 89%), low emission (less than or equal to 32 μgC/g) and acceptable odor ratings (less than or equal to 3.8).

This experiment shows that the use of an aromatic amine in combination with a rosin ester enables good foam adhesion properties at lower amine concentration than would have been required to achieve the same properties in the absence of the rosin ester. Such compositions with low amine concentrations are desirable for reducing cost. Thus, good foam adhesion, good thermal stability and low odor and emission are enabled by the use of an aromatic amine at about 0.5 to about 1.5 weight percent, in combination with a rosin ester at from zero to about 6 weight percent, a hydrogenated hydrocarbon resin at about 3 to about 9 weight percent, and activated carbon at about 1 to about 2 weight percent. It is especially preferred to use an aromatic amine at about 0.5 to about 1.5 weight percent, in combination with a rosin ester at about 3 to about 6 weight percent, a hydrogenated hydrocarbon resin at about 3 to about 9 weight percent, and activated carbon at about 1 to about 2 weight percent, based on the weight of the entire composition.

What is claimed is:

1. A thermoplastic composition, comprising: (a) a poly(arylene ether) at about 20 to about 80 weight percent; (b) a poly(alkenylaromatic) material at about 20 to about 80 weight percent; and (c) an aromatic amine at about 0.1 to about 25 weight percent, based on the weight of the entire composition, wherein said aromatic amine is represented by the formula

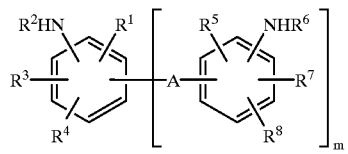

wherein $R^1$, $R^3$, $R^4$, $R^5$, $R^7$ and $R^8$ are independently hydrogen, linear or branched monovalent alkyl having one to six carbon atoms, or halogen; $R^2$ and $R^6$ are independently hydrogen or monovalent alkyl having one to six carbon atoms; m is 1 or 2; and A is a direct aromatic ring fusion, a direct single bond or a divalent radical selected from the group consisting of

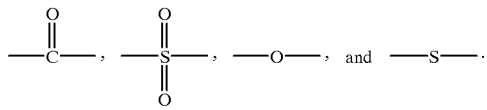

2. A thermoplastic composition according to claim 1, wherein said aromatic amine is selected from the group consisting of 4,4'-diaminodiphenyl sulfide, 4,4'-diaminodiphenyl sulfone, 4,4'-diaminodiphenyl ether, 1,5-diaminonaphthalene, benzidine, 3,3'-dimethylbenzidine, 3,3'-dimethoxybenzidine, bis(p-beta-amino-t-butylphenyl) ether, and mixtures comprising at least one of these compounds.

3. A thermoplastic composition, comprising: (a) a poly(arylene ether) at about 20 to about 80 weight percent; (b) a poly(alkenylaromatic) material at about 20 to about 80 weight percent; and (c) an aromatic amine at about 0.1 to about 25 weight percent, based on the weight of the entire composition, wherein said aromatic amine is selected from the group consisting of

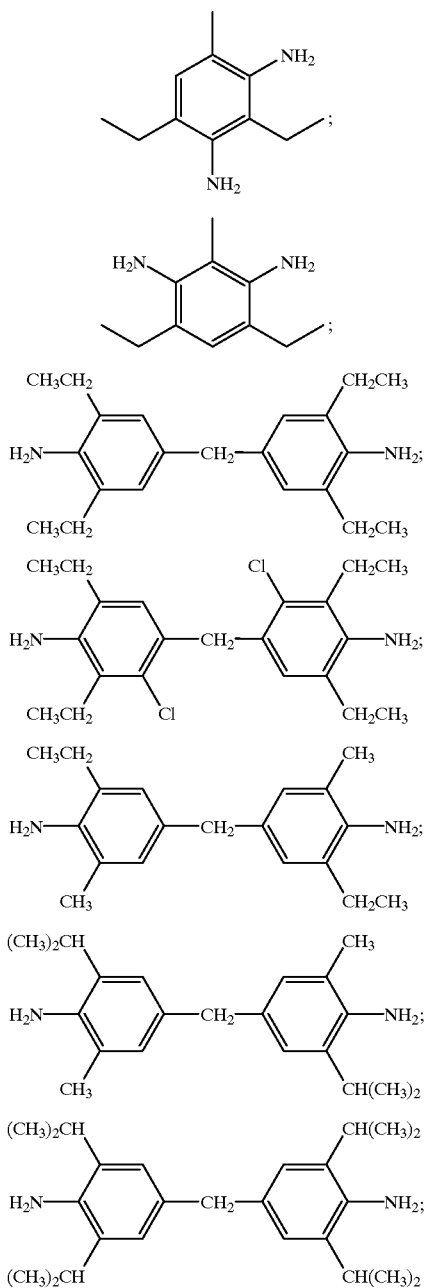

and mixtures comprising at least one of these compounds.

4. A thermoplastic composition, comprising:

(a) a poly(arylene ether) resin at about 20 to about 75 weight percent;

(b) a poly(alkenylaromatic) compound at about 20 to about 75 weight percent;

(c) an aromatic amine at about 0.1 to about 25 weight percent, wherein said aromatic amine is represented by the formula

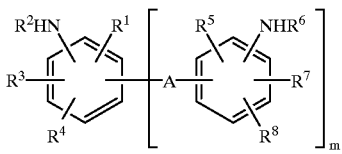

wherein $R^1$, $R^3$, $R^4$, $R^5$, $R^7$ and $R^8$ are independently hydrogen, linear or branched monovalent alkyl having one to six carbon atoms, or halogen; $R^2$ and $R^6$ are independently hydrogen or monovalent alkyl having one to six carbon atoms; m is 1 or 2; and A is a direct aromatic ring fusion, a direct single bond or a divalent radical selected from the group consisting of

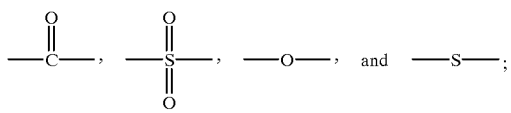

(d) a first tackifier resin at about 0.1 to about 20 weight percent; and (e) a rubber at about 0.1 to about 15 weight percent, based on the weight of the entire composition.

5. A thermoplastic composition according to claim 4, further comprising a second tackifier resin at about 0.1 to about 20 weight percent.

6. A thermoplastic composition according to claim 5, wherein the first tackifier resin comprises a rosin ester and the second tackifier resin comprises a hydrogenated hydrocarbon resin, a hydrogenated polyterpene resin, or a mixture comprising at least one of these materials.

7. A thermoplastic composition according to claim 4, further comprising activated carbon at about 1 to about 3 weight percent.

8. A thermoplastic composition according to claim 4, further comprising a reinforcing filler at about 5 to about 30 weight percent, based on the weight of the entire composition.

9. A thermoplastic resin composition, comprising the reaction product of:

(a) a poly(arylene ether) at about 20 to about 80 weight percent; (b) a poly(alkenylaromatic) material at about 20 to about 80 weight percent; and (c) an aromatic amine at about 0.1 to about weight percent, wherein said aromatic amine is represented by the formula

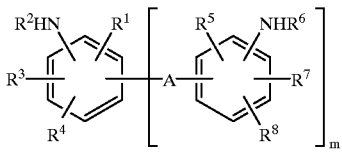

wherein $R^1$, $R^3$, $R^4$, $R^5$, $R^7$ and $R^8$ are independently hydrogen, linear or branched monovalent alkyl having one to six carbon atoms, or halogen; $R^2$ and $R^6$ are independently hydrogen or monovalent alkyl having one to six carbon atoms; m is 1 or 2; and A is a direct aromatic ring fusion, a direct single bond or a divalent radical selected from the group consisting of

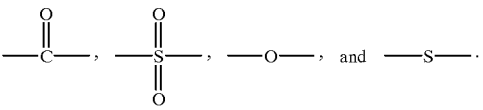

10. An article comprising the thermoplastic resin composition of claim 9.

11. An automobile interior part comprising the thermoplastic resin composition of claim 9 and polyurethane foam.

12. A thermoplastic composition, comprising: (a) a poly(arylene ether) at about 20 to about 80 weight percent; (b) a poly(alkenylaromatic) material at about 20 to about 80 weight percent; and (c) an aromatic amine at about 0.1 to about 25 weight percent, based on the weight of the entire composition, wherein said aromatic amine is selected from the group consisting of 4,4'-diaminodiphenylpropane, bis(2-chloro-4-amino-3,5-diethylphenyl) methane, 2,4-bis(beta-amino-t-butyl)toluene, bis(p-beta-methyl-o-aminophenyl) benzene, bis(p-beta-methyl-o-aminopentyl)benzene, 1,3-diamino-4-isopropylbenzene, 2-methyl-4,6-diethyl-1,3-phenylenediamine, 5-methyl-4,6-diethyl-1,3-phenylenediamine, isomers of diethyltoluenediamine, 4,4'-methylene-bis-(2-ethyl-6-methylaniline), 4,4'-methylene-bis-(2,6-diethylaniline), 4,4'-methylene-bis-(2-isopropyl-6-methylaniline), 4,4'-methylene-bis-(2,6-diisopropylaniline), 4,4'-methylene-bis-(3-chloro-2,6-diethylaniline), 4,4'-diaminodiphenyl sulfide, 4,4'-diaminodiphenyl sulfone, 4,4'-diaminodiphenyl ether, 1,5-diaminonaphthalene, benzidine, 3,3'-dimethylbenzidine, 3,3'-dimethoxybenzidine, bis(p-beta-amino-t-butylphenyl)ether, and mixtures comprising at least one of these compounds.

13. A thermoplastic composition according to claim 12, wherein said aromatic amine is selected from the group consisting of

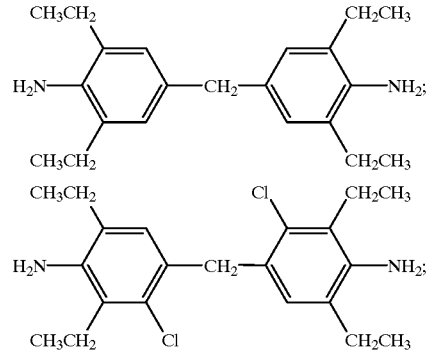

and mixtures comprising at least one of these compounds.

14. A thermoplastic composition according to claim 12, further comprising a tackifier resin at about 0.1 to about 20 weight percent.

15. A thermoplastic composition according to claim 14, wherein said tackifier resin comprises a rosin ester.

16. A thermoplastic composition according to claim 12, further comprising a reinforcing filler at about 5 to about 30 weight percent.

17. A method for making a thermoplastic composition, comprising:

admixing poly(arylene ether) at about 20 to about 80 weight percent; a poly(alkenylaromatic) material at about 20 to about 80 weight percent; and an aromatic amine at about 0.1 to about 25 weight percent based on the weight of the entire composition, wherein said aromatic amine is represented by the formula

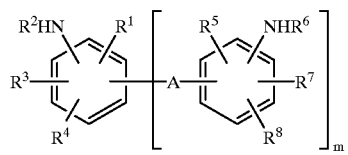

wherein $R^1$, $R^3$, $R^4$, $R^5$, $R^7$ and $R^8$ are independently hydrogen, linear or branched monovalent alkyl having one to six carbon atoms, or halogen; $R^2$ and $R^6$ are independently hydrogen or monovalent alkyl having one to six carbon atoms; m is 1 or 2; and A is a direct aromatic ring fusion, a direct single bond or a divalent radical selected from the group consisting of

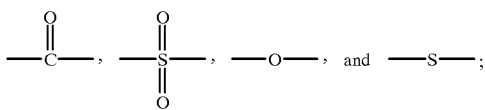

steam stripping the admixture; and vacuum venting the admixture.

18. A method according to claim 17, wherein said tackifier resin is present at about 0.1 to about 20 weight percent based on the weight of the entire composition.

19. A method according to claim 17, wherein said reinforcing filler is present at about 5 to about 30 weight percent based on the weight of the entire composition.

* * * * *